(12) United States Patent
Seo

(10) Patent No.: US 8,300,119 B2
(45) Date of Patent: Oct. 30, 2012

(54) COMPACT LENS OPTICAL SYSTEM AND DIGITAL CAMERA MODULE INCLUDING THE SAME

(75) Inventor: Jin-seon Seo, Jinju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 12/956,284

(22) Filed: Nov. 30, 2010

(65) Prior Publication Data

US 2011/0141339 A1  Jun. 16, 2011

(30) Foreign Application Priority Data

Dec. 15, 2009  (KR) ........................ 10-2009-0125027

(51) Int. Cl.
*H04N 5/262* (2006.01)
*H04N 9/097* (2006.01)

(52) U.S. Cl. .................. 348/240.99; 348/259; 348/335; 359/672

(58) Field of Classification Search ............. 348/240.99, 348/259, 335
See application file for complete search history.

(56) References Cited

U.S. PATENT DOCUMENTS

| | | | |
|---|---|---|---|
| 7,145,732 B2 * | 12/2006 | Matsusaka et al. | 359/689 |
| 7,215,481 B2 * | 5/2007 | Ogata | 359/682 |
| 2003/0011830 A1 * | 1/2003 | Miyatake | 358/513 |
| 2007/0103794 A1 * | 5/2007 | Abe et al. | 359/686 |
| 2010/0097707 A1 * | 4/2010 | Seo | 359/672 |
| 2011/0025866 A1 * | 2/2011 | Seo et al. | 348/220.1 |

* cited by examiner

*Primary Examiner* — Hung Lam
(74) *Attorney, Agent, or Firm* — Drinker Biddle & Reath LLP

(57) ABSTRACT

A lens optical system includes a first optical system and a second optical system. The lens optical system includes at least one reflection member to selectively redirect optical paths of light representing objects from first and second directions toward a photographing device. The first optical system includes, in order from an object to the photographing device along the optical axis, a first lens group including a first reflection member, a second lens group having a negative refractive power, a third lens group having a positive refractive power, and a fourth lens group having a positive refractive power. The second optical system shares at least one optical element with the first optical system.

19 Claims, 16 Drawing Sheets

(WIDE MODE)

(NORMAL MODE)

COMPACT LENS OPTICAL SYSTEM AND DIGITAL CAMERA MODULE INCLUDING THE SAME

CROSS-REFERENCE TO RELATED PATENT APPLICATIONS

This application claims the priority benefit of Korean Patent Application No. 10-2009-0125027, filed on Dec. 15, 2009, in the Korean Intellectual Property Office, the disclosure of which is incorporated herein in its entirety by reference.

BACKGROUND

1. Field of the Invention

The present invention relates to a compact lens optical system and a digital camera module including the same, and more particularly, to a compact lens optical system suitable for a compact digital camera and a mobile communications device, and a digital camera module including the compact lens optical system.

2. Description of the Related Art

As the size and thickness of digital cameras have been decreased, most cameras employ a refractive optical system to cope with the trend. Also, many digital cameras employ a zoom optical system to improve convenience. However, as the size and thickness of the digital camera decreases, the inner space of the digital camera decreases as well so that a focal length may be limited by using the zoom optical system only; that is, there is a limit in increasing an optical zoom magnification ratio. Thus, there is a demand to simultaneously employ a single focus wide-angle optical system with the zoom optical system. However, since two sensors are needed for two optical systems, the volume and manufacturing cost of a digital camera increase.

As the use of mobile communications devices becomes popular, a demand not only for a basic communications function but for related additional functions increases. Also, a demand for mobile communications devices having a wireless Internet communications function or digital camera function increases. Recently, mobile communications devices, such as camera phones capable of taking a picture and making a video call by combining the wireless Internet communications function and the digital camera function, have been introduced.

The mobile communications device is equipped with two camera modules, that is, one for videotelephony and the other for general image photography. This is because, in the videotelephony and the general image photography, objects are located at the opposite sides with respect to the screen of a mobile communications device. To implement the two camera modules, two optical systems and two image sensors are needed. Furthermore, to realize high pixel and high performance camera modules according to the user's demands, the manufacturing costs of the mobile communications device increase.

SUMMARY

According to an embodiment, a lens optical system includes a first optical system comprising, in order from an object to an image sensor side along an optical axis, a first lens group, a second lens group, a third lens group, and a fourth lens group. The first lens group includes a first reflection member that selectively redirects an optical path of light representing the object from a first direction toward the image sensor side. The second lens group has a negative refractive power. The third lens group has a positive refractive power. The fourth lens group has a positive refractive power. During zooming from a wide mode to a tele mode, the first lens group is fixed, the second lens group moves toward the image sensor side and then toward the object side, the third lens group moves toward the object side, and the fourth lens group performs focusing. The first lens group may include, in order from the object side along the optical axis, a negative meniscus lens having a convex surface facing the object side, a right-angled prism redirecting the optical path by 90° toward the image sensor side, and at least one lens having positive refractive power.

The third lens group may include a first double-convex lens and a doublet lens including a second double-convex lens and a double-concave lens.

The third lens group may include at least one unit of an aspherical lens.

The lens optical system may satisfy Inequalities 1 and 2:

$$40 < v32 < 47 \quad \text{[Inequality 1]}$$

wherein "v32" denotes the Abbe's number of the second double-convex lens of the doublet lens of the third lens group, and $$-0.1 < nd32 - nd33 < 0.1 \quad \text{[Inequality 2]}$$

wherein "nd32" denotes a refractive index of the second double-convex lens of the doublet lens of the third lens group with respect to a D-line and "nd33" denotes a refractive index of the double-concave lens of the doublet lens of the third lens group with respect to a D-line.

The lens optical system may satisfy Inequality 3:

$$1.4 < |f3/fw| < 1.8 \quad \text{[Inequality 3]}$$

wherein "f3" denotes a focal length of the third lens group and "fw" denotes a focal length in a wide mode.

The fourth lens group may include at least one unit of an aspherical lens.

The lens optical system may further include a second optical system, the second optical system comprising a second reflection member that selectively redirects an optical path of light representing an object from a second direction toward the image sensor side, and wherein the second optical system shares at least one optical element with the first optical system.

The first optical system may be a zoom lens optical system and the second optical system may be a single focus optical system having a focal length shorter than a focal length of the zoom lens optical system.

The at least one optical element shared by the first and second optical systems may include the third lens group and the fourth lens group of the first optical system and a photographing device at the image sensor side, wherein the second optical system comprises a first lens group comprising the second reflection member and having a negative refractive power, the third lens group, the fourth lens group, and the photographing device, in order from the object side to the image sensor side along the optical axis.

The first lens group of the second optical system may include at least one unit of an aspherical lens and may comprise a double-concave lens, a double-convex lens, and the second reflection member, in order from the object side to the image sensor side along the optical axis.

The first and second directions may be opposite to each other on different axes.

The first and second directions may be identical directions on different axes.

According to another embodiment, a digital camera module comprises a photographing device at an image sensor side, the first optical system, and the second optical system, wherein the first optical system performs general photography and the second optical system performs self photography or a video call.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
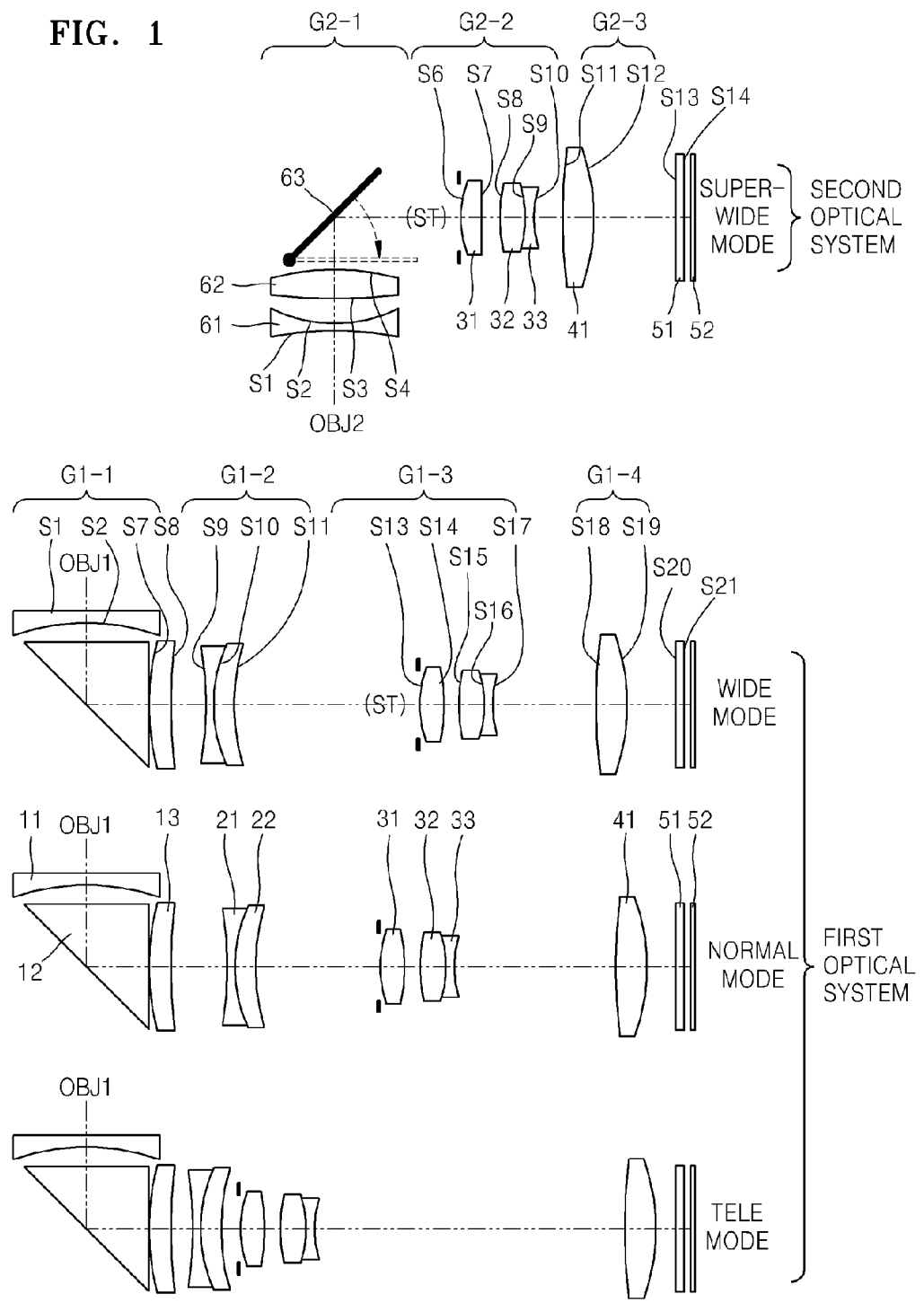
FIG. 1 schematically illustrates a lens optical system according to an embodiment, operating respectively in a wide mode, a normal mode, a tele mode, and a super-wide mode.
Figure 2:
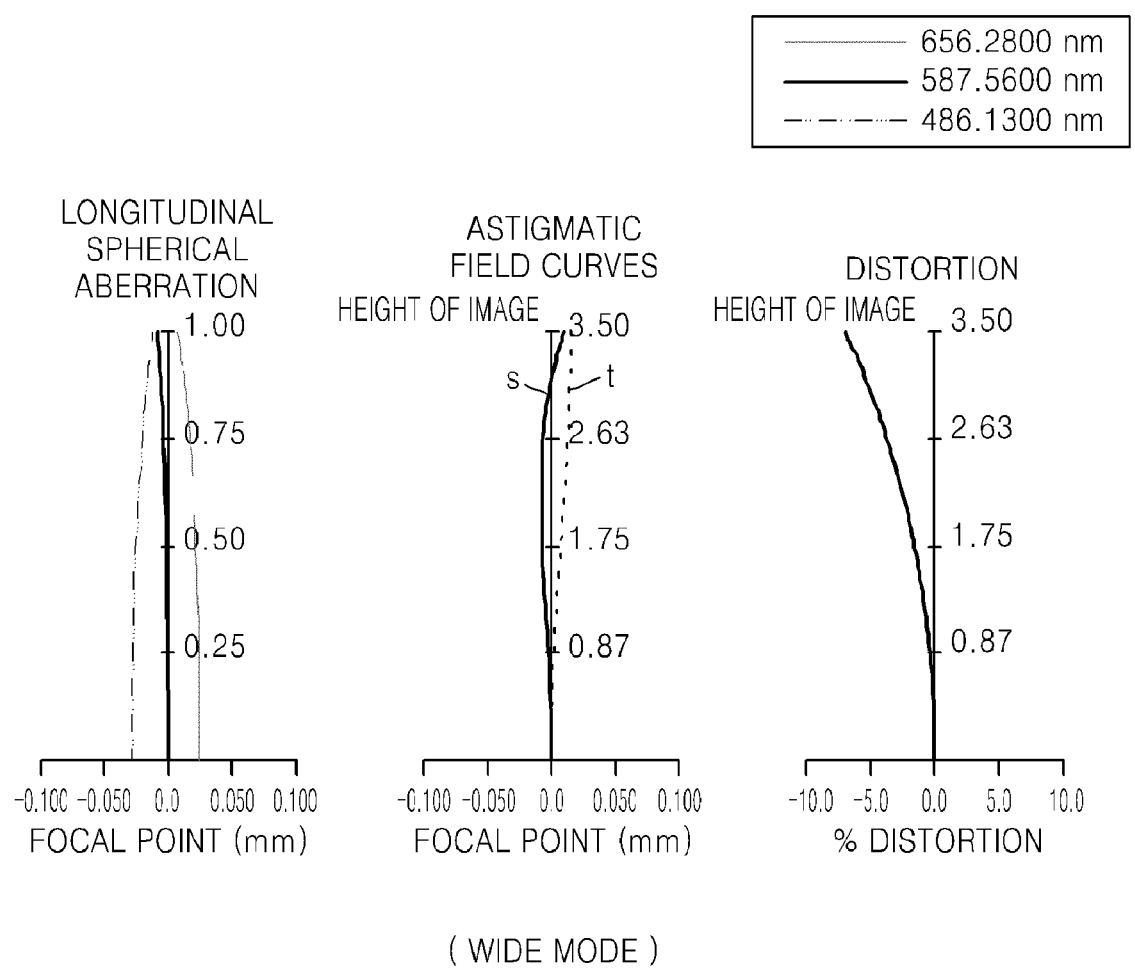
FIG. 2 illustrates longitudinal spherical aberration, astigmatic field curves, and distortion of the lens optical system of FIG. 1 in the wide mode.
Figure 3:
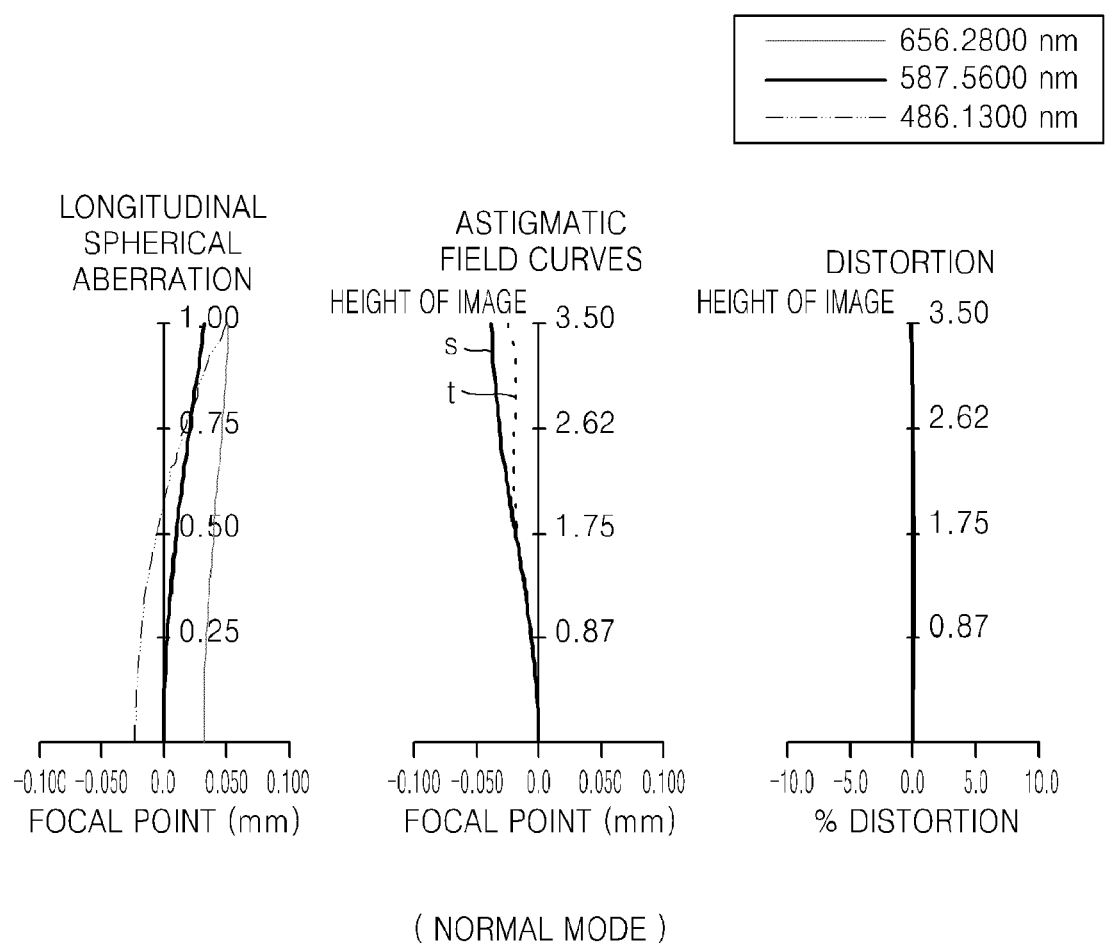
FIG. 3 illustrates longitudinal spherical aberration, astigmatic field curves, and distortion of the lens optical system of FIG. 1 in the normal mode.
Figure 4:
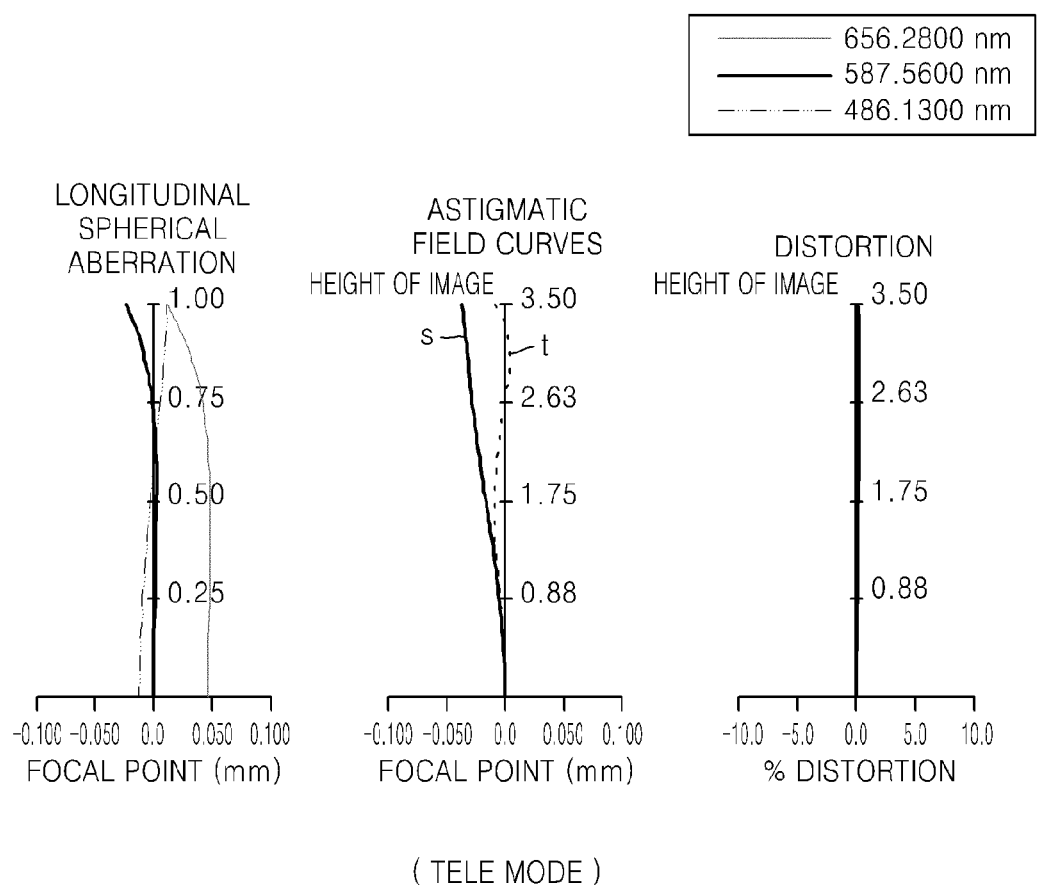
FIG. 4 illustrates longitudinal spherical aberration, astigmatic field curves, and distortion of the lens optical system of FIG. 1 in the tele mode.
Figure 5:
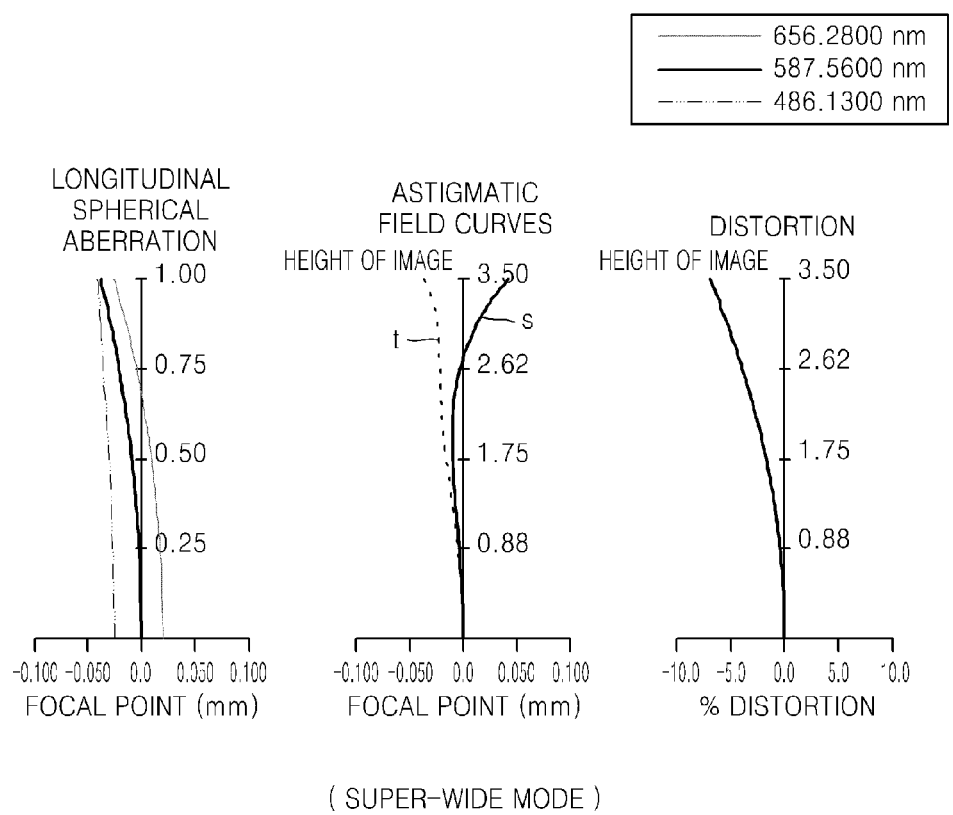
FIG. 5 illustrates longitudinal spherical aberration, astigmatic field curves, and distortion of the lens optical system of FIG. 1 in the super-wide mode.

The attached drawings are referred to in order to gain a sufficient understanding of the illustrated embodiments, the merits thereof, and the objectives accomplished by the implementation thereof. Hereinafter, the exemplary embodiments will be described in detail with reference to the attached drawings. Like reference numerals in the drawings denote like elements.

FIG. 1 schematically illustrates a lens optical system according to an embodiment, operating respectively in a wide mode, a normal mode, a tele mode, and a super-wide mode. The lens optical system according to the embodiment includes a first optical system and a second optical system. In an embodiment, the first optical system may be a zoom lens optical system having a wide mode, a normal mode, and a tele mode. The second optical system may be a single focus super-wide angle optical system.

The first optical system includes a first lens group G1-1, a second lens group G1-2, a third lens group G1-3, and a fourth lens group G1-4, which are sequentially arranged along an optical axis from an object side.

The first lens group G1-1 may include a first incident lens 11, a first reflection member 12, and a positive meniscus lens 13. The first reflection member 12 refracts the optical path of light indicating the object from a first direction (OBJ1), by 90°, to proceed toward a photographing device 52. The first reflection member 12 may be a prism or a reflection mirror. The first incident lens 11 may be a negative meniscus lens. One lens unit of the first lens group G1-1, for example, the positive meniscus lens 13, may have a positive refractive power.

The first lens group G1-1 may include a negative meniscus lens having a convex surface facing the object, a right-angled prism changing the optical path by 90°, and a lens having a positive refractive power, which are arranged along the optical axis from the object side. According to the above arrangement, longitudinal chromatic aberration and lateral chromatic aberration generated by the first lens group G1-1 may be sufficiently corrected.

In the present embodiment, the first lens group G1-1 has a negative refractive power. However, since the first lens group G1-1 has a low refractive power, the first lens group G1-1 may have a positive refractive power or a negative refractive power. The first lens group G1-1 is fixed during zooming from the wide mode to the tele mode.

The second lens group G1-2 has a negative refractive power. The second lens group G1-2 may include two units of lenses 21 and 22. The two lens units may be one unit of a double-concave lens 21 and one unit of a positive meniscus lens 22. The second lens group G1-2 moves toward the image side and then back toward the object side during the zooming from the wide mode to the tele mode.

The third lens group G1-3 has a positive refractive power. The third lens group G1-3 may include three units of lenses 31, 32, and 33. The three lens units may be two units of first and second double-convex lenses 31 and 32 and one unit of a double-concave lens 33. The second double-convex lens 32 and the double-concave lens 33 are combined to each other to form a doublet lens that is useful to remove chromatic aberration. The third lens group G1-3 moves toward the object side during the zooming from the wide mode to the tele mode. The both sides of the first double-convex lens 31 are aspherical so that spherical aberration may be reduced.

The fourth lens group G1-4 has a positive refractive power. The fourth lens group G1-4 may be a double-convex lens 41. One side S19 of the double-convex lens 41 is aspherical. The fourth lens group G1-4 slightly moves from the object side toward the image side during the zooming from the wide mode to the tele mode. The fourth lens group G1-4 may perform an auto focusing function. By setting the refractive power of the lens group closest to the image side to be positive and arranging an aspherical surface, telecentricity that is required by a solid photographing device such as a charge coupled device (CCD) is made possible. That is, the incident angle of light incident on a peripheral portion of a photographing surface may be configured to be almost perpendicular to the photographing surface.

The first optical system is advantageous in miniaturization of an optical system because the first to fourth lens groups G1-1, G1-2, G1-3, and G1-4 minimize the entire length of the optical system and reduce the amount of movement of each lens group during zooming.

The first optical system may satisfy Inequalities 1 and 2 below.

$$40<v32<47 \quad \text{[Inequality 1]}$$

In Inequality 1, "v32" denotes the Abbe's number of the second double-convex lens 32 of the doublet lens of the third lens group G1-3.

Inequality 1 is a conditional expression to effectively correct chromatic aberration generated in the third lens group G1-3. When the second double-convex lens 32 has an Abbe's number of 47 or higher, the refractive power decreases and thus power decreases and the entire length extends. Thus, it is disadvantageous in reducing the entire length for miniaturization. In contrast, when the second double-convex lens 32 has an Abbe's number of 40 or lower, although astigmatism is low to a wide angle end, spherical aberration increases so that performance may be deteriorated. When Inequality 1 is satisfied, the lateral chromatic aberration in the wide mode of the first optical system may be sufficiently corrected and the longitudinal chromatic aberration in the tele mode may be sufficiently corrected.

$$-0.1<nd32-nd33<0.1 \quad \text{[Inequality 2]}$$

In Inequality 2, "nd32" denotes a refractive index for D-line of the second double-convex lens 32 of the doublet lens of the third lens group G1-3 and "nd33" denotes a refractive index for D-line of the double-concave lens 33 of the doublet lens of the third lens group G1-3.

Inequality 2 is a conditional expression to reduce chromatic aberration of the doublet lens of the third lens group G1-3 and levelize field curvature. When the difference in the refractive index is not greater than −0.1, the field curvature becomes severe and the power refraction of the doublet lens decreases so that the entire length may extend. In contrast, when the difference in the refractive index is not smaller than 0.1, the refractive power of the double-concave lens 33 having a negative refractive power decreases and thus the entire length extends, which is disadvantage for miniaturization. When Inequality 2 is satisfied, the refractive index difference is adjusted so that the Petzval sum may decrease. Also, the entire length may be reduced by arranging the focal point of the third lens group G1-3 at the object side.

$$1.4<|f3/fw|<1.8 \quad \text{[Inequality 3]}$$

In Inequality 3, "f3" denotes the focal length of the third lens group G1-3 and "fw" denotes the focal length in the wide mode.

Inequality 3 is a conditional expression to define the focal lengths of the lens group G1-3 and the focal length in the wide mode. When the ratio of the focal distance of the third lens group G1-3 to the focal length in the wide mode is not greater than 1.4, it is difficult to obtain a zooming ratio of 3 times or higher, the power of the second lens group G1-2 increases, the Petzval sum is excessively corrected, and the remaining field curvature increases. In contrast, when the ratio of the focal length is not smaller than 1.8, the entire length increases, which is disadvantageous in the miniaturization. As described above, as the third lens group G1-3 includes at least one unit of an aspherical lens, the aspherical aberration may be minimized.

In the lens optical system of FIG. 1, the "v32" of Inequality 1 that is the Abbe's number of the second double-convex lens 32 of the doublet lens of the third lens group G1-3 is 46.5, which satisfies the conditions of Inequality 1. The "nd32−nd33" of Inequality 2 that is the difference in the refractive index is 0.02, which satisfies the conditions of Inequality 2. The "|f3/fw|" of Inequality 3 that is the ratio of the focal length is 1.6, which satisfies the conditions of Inequality 3.

Table 1 shows design data of the first optical system according to the embodiment illustrated in FIG. 1.

TABLE 1

| Lens Surface | R | D | Nd | Vd |
| --- | --- | --- | --- | --- |
| OBJ | INFINITY | | | |
| S1 | 145.419 | 0.6 | 1.92286 | 20.9 |
| S2 | 12.923 | 1.246 | | |
| S3 | INFINITY | 3.537 | 1.83400 | 37.4 |
| S4 | INFINITY | 0 | | |
| S5 | INFINITY | 3.537 | | |
| S6 | INFINITY | 0.1 | | |
| S7 | 17.921 | 1.31 | 1.90366 | 31.3 |
| S8 | 101.998 | D1 | | |
| S9 | −23.107 | 0.5 | 1.49700 | 81.6 |
| S10 | 8.161 | 1.184 | 1.92286 | 20.9 |
| S11 | 12.522 | D2 | | |
| ST: | INFINITY | 0.2 | | |
| S13* | 6.533 | 1.138 | 1.82080 | 42.7 |
| S14* | −31.432 | 1.075 | | |
| S15 | 11.4 | 1.425 | 1.80420 | 46.5 |
| S16 | −6.151 | 0.4 | 1.78472 | 25.7 |
| S17 | 3.946 | D3 | | |
| S18 | 49.723 | 1.5 | 1.76802 | 49.2 |
| S19* | −10.989 | D4 | | |
| S20 | INFINITY | 0.5 | 1.51680 | 64.2 |
| S21 | INFINITY | 0.4 | | |
| IMG | INFINITY | | | |

In Table 1, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

The second optical system may include three lens groups. For example, the second optical system includes a first lens group G2-1, a second lens group G2-2, and a third lens group G2-3, sequentially arranged along the optical axis from the object side toward the image side. The second optical system is a single focus super-wide angle optical system.

The first lens group G2-1 of the second optical system may include one unit of a double-concave lens 61, one unit of a double-convex lens 62, and a second reflection member 63. The second incident lens 61 is a double-concave lens. The first lens group G2-1 of the second optical system has a negative refractive power.

The second incident lens 61 faces the opposite direction to a direction that the first incident lens 11 of the first optical system faces. That is, the second optical system that is the single focus super-wide angle optical system is used to photograph an object located at the opposite side to the first optical system.

The second reflection member 63 selectively refracts the optical path of object light from a second direction (OBJ2) to proceed toward the photographing device 52. For example, when the second reflection member 63 is moved to be located between the second lens group G1-2 and the third lens group G1-3 of the first optical system, object light OBJ2 input from the second direction is formed on the photographing device 52. In contrast, when the second reflection member 63 is moved to be out of the first optical system, object light OBJ1 input from the first direction is formed on the photographing device 52. The second reflection member 63 may be a rotatable reflection mirror or a movable prism.

The second lens group G2-2 of the second optical system is the third lens group G1-3 of the first optical system. Also, the third lens group G2-3 of the second optical system is the fourth lens group G1-4 of the first optical system. That is, the first and second optical systems share the third and fourth lens groups G1-3 and G1-4 and the photographing device 52.

In a first optical mode using the first optical system, the object light OBJ1 input through the first incident lens 11 in one direction is refracted by 90° to proceed toward the photographing device 52. For example, in a digital camera or a camera phone, the first optical mode may be used for a user to photograph another object by using the first optical system.

In a second optical mode using the second optical system, the user may photograph a self image or make a video call. This is because the second optical system may photograph the object light OBJ2 input through the second incident lens 61 in the opposite direction.

In the present embodiment, the switching between the first optical mode and the second optical mode is performed by the rotation of the second reflection member 63. For example, in the second optical mode, the second reflection member 63 pivots by 45° such that the object light OBJ2 may proceed toward the photographing device 52. In contrast, in the first optical mode, the second reflection member 63 pivots to be close to the double-convex lens 62 such that the object light OBJ1 from the opposite direction may be refracted by the first reflection member 12 to proceed toward the photographing device 52.

The focal length of the second optical system is shorter than that of the first optical system in a wide mode. As described above, the second optical system is used for the self photography or video calling. Since the user is located close to a camera module, a wide viewing angle is preferable. In the present embodiment, the focal length of the second optical system is shorter than that of the first optical system in a wide mode. Accordingly, since photography with a super-wide angle is available, the second optical system is suitable for the self photography or video calling.

Table 2 shows design data of the second optical system of the embodiment of FIG. 1.

TABLE 2

| Lens Surface | R | D | Nd | Vd |
|---|---|---|---|---|
| OBJ | INFINITY | | | |
| S1* | −28.579 | 0.6 | 1.9037 | 31.3 |
| S2* | 6.7 | 1.356 | — | |
| S3 | 50 | 1.644 | 1.9229 | 20.9 |
| S4* | −17.635 | 9.996 | — | |
| ST: | INFINITY | 0.2 | — | |
| S6* | 6.533 | 1.138 | 1.8208 | 42.7 |
| S7* | −31.432 | 1.075 | — | |
| S8 | 11.4 | 1.425 | 1.8042 | 46.5 |
| S9 | −6.151 | 0.4 | 1.7847 | 25.7 |
| S10 | 3.946 | D3 | — | |
| S11 | 49.723 | 1.5 | 1.7680 | 49.2 |
| S12* | −10.989 | D4 | — | |
| S13 | INFINITY | 0.5 | 1.5168 | 64.2 |
| S14 | INFINITY | 0.4 | | |
| IMG | INFINITY | | | |

In Table 2, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

The lens optical system of FIG. 1 can correct spherical aberration by including at least one aspherical lens. The definition of the aspherical surface is as follows.

Assuming that the optical axis direction facing the photographing device is an x-axis, the direction perpendicular to the optical axis, that is, the direction in which object light is input through the incident lens, is a y-axis, and with a direction in which a light ray proceeds is set to be positive, the shape of an aspherical surface may be expressed by Equation 1.

$$x = \frac{cy^2}{1+\sqrt{1-(K+1)c^2h^2}} + Ah^2 + Bh^6 + Ch^8 + Dh^{10} \quad \text{[Equation 1]}$$

In Equation 1, "x" denotes the distance from the apex of the lens in the optical axis direction, "y" denotes the distance in a direction perpendicular to the optical axis, "K" denotes a conic constant, "A", "B", "C", and "D" denote aspherical coefficients, and "c" denotes the reciprocal (1/R) of the radius of curvature at the apex of the lens.

Table 3 shows the aspherical coefficients in the lens optical system according to the embodiment of FIG. 1.

TABLE 3

| | Lens Surface | K | A | B | C | D |
|---|---|---|---|---|---|---|
| First Optical System | S13 | −0.995365 | 0.0000E+00 | 0.0000E+00 | 0.0000E+00 | 0.0000E+00 |
| | S14 | −39.709464 | 5.9965E−05 | 0.0000E+00 | 0.0000E+00 | 0.0000E+00 |
| | S19 | 0.824144 | 5.5604E−04 | −5.3501E−06 | 0.0000E+00 | 0.0000E+00 |
| Second Optical System | S1 | −1 | 0.00E+00 | 0.00E+00 | 0.00E+00 | 0.00E+00 |
| | S2 | −1 | 0.00E+00 | 0.00E+00 | 0.00E+00 | 0.00E+00 |
| | S4 | 6.79156 | 5.03E−05 | 1.24E−06 | 0.00E+00 | 0.00E+00 |

Table 4 shows data of variable distances during zooming in the lens optical system according to the embodiment of FIG. 1.

TABLE 4

|  | Wide Mode | Normal Mode | Tele Mode | Super-wide mode |
|---|---|---|---|---|
| EFL | 6.5001 | 10.7248 | 18.5232 | 5.2003 |
| 2ω | 60.14 | 36.23 | 21.4 | 71.8 |
| Fno | 3.0875 | 4.2459 | 6.0656 | 2.5629 |
| D1 | 1.744 | 2.986 | 0.946 | — |
| D2 | 10.496 | 5.139 | 1 | — |
| D3 | 6.219 | 11.342 | 18.179 | 2 |
| D4 | 2.888 | 1.86 | 1.2 | 4.778 |

In Table 4, "EFL" denotes the effective focal length of the overall lens system, "Fno" denotes the F number, "2ω" denotes the full viewing angle, "D1" denotes the distance between the first lens group G1-1 and the second lens group G1-2, "D2" denotes the distance between the second lens group G1-2 and the third lens group G1-3, "D3" denotes the distance between the third lens group G1-3 and the fourth lens group G1-4, and "D4" denotes the distance between the fourth lens group G1-4 and an infrared ray filter 51.

FIGS. 2-5 illustrate longitudinal spherical aberration, astigmatic field curves, and distortion of the lens optical system of FIG. 1 in the wide mode, the normal mode, the tele mode, and the super-wide mode, respectively. Although the lens optical system is described to include both of the first and second optical systems in the above, the invention is not limited thereto. That is, a lens optical system having the first optical system only that is a zoom lens optical system is available.

Figure 6:
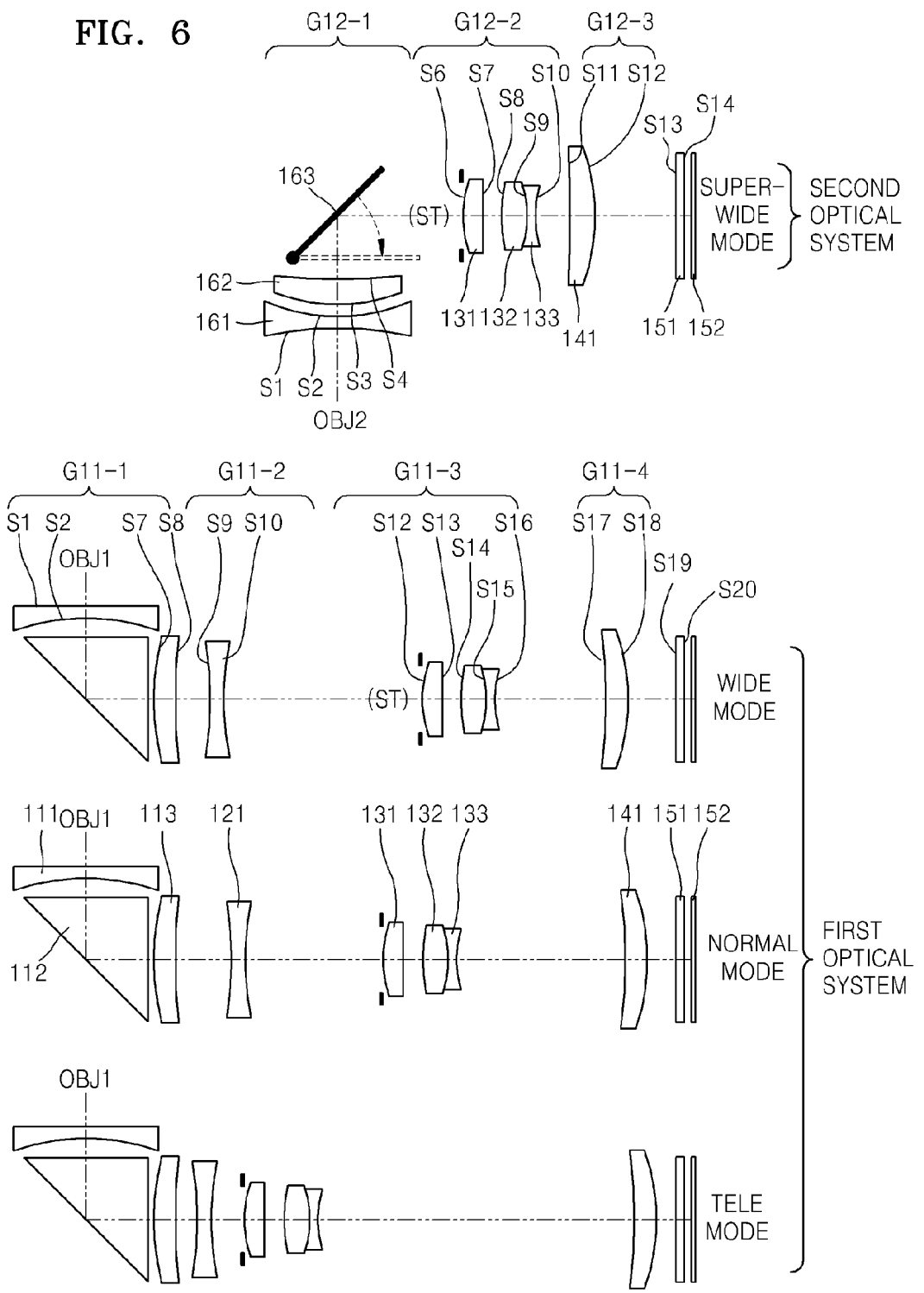
FIG. 6 schematically illustrates a lens optical system according to another embodiment, operating respectively in a wide mode, a normal mode, a tele mode, and a super-wide mode.
Figure 7:
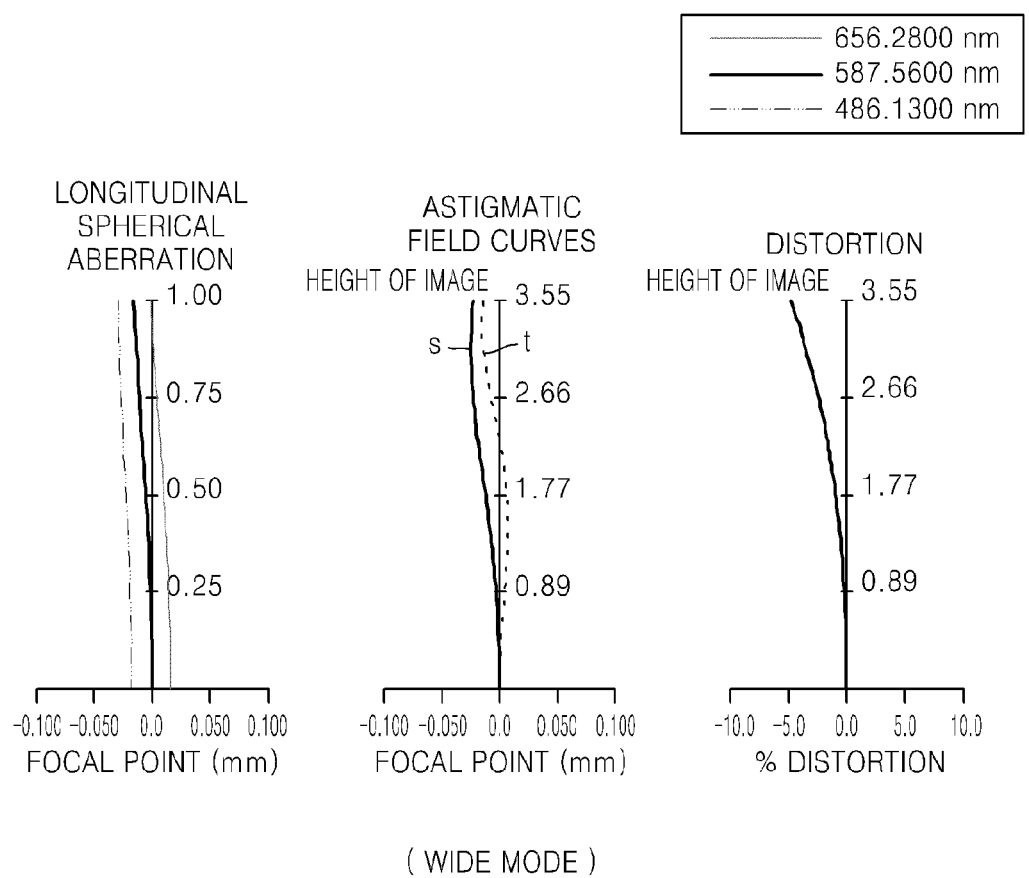
FIG. 7 illustrates longitudinal spherical aberration, astigmatic field curves, and distortion of the lens optical system of FIG. 6 in the wide mode.
Figure 8:
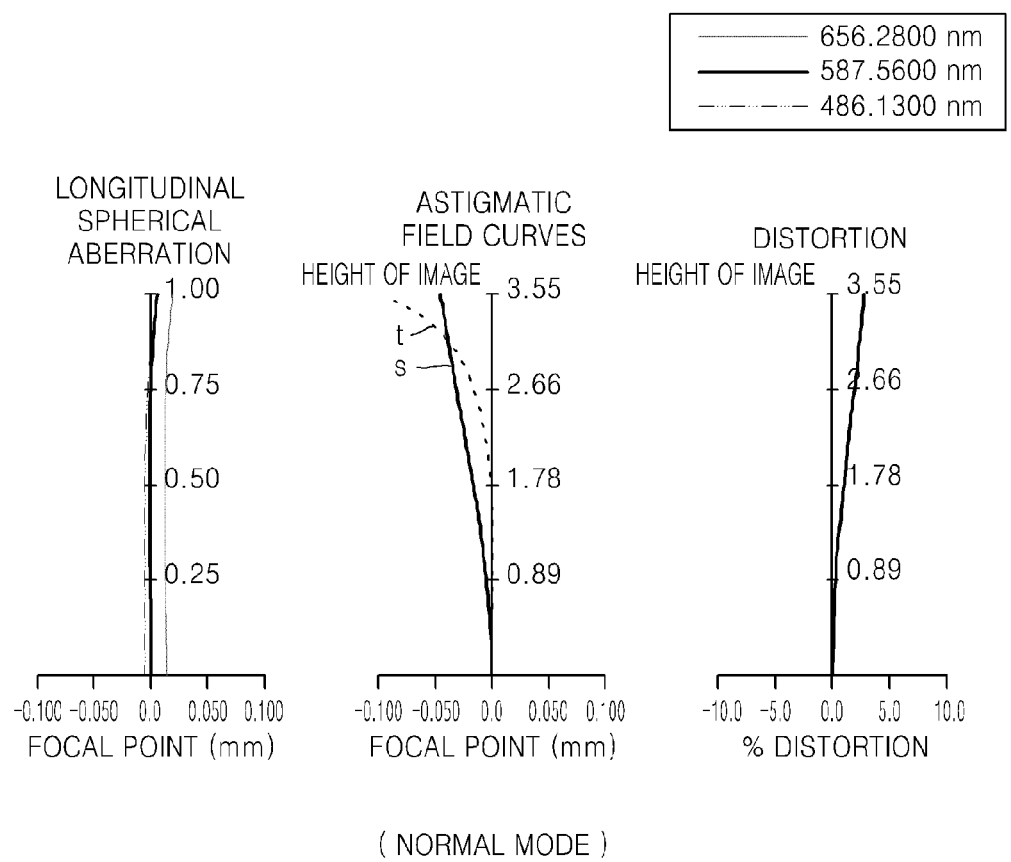
FIG. 8 illustrates longitudinal spherical aberration, astigmatic field curves, and distortion of the lens optical system of FIG. 6 in the normal mode.
Figure 9:
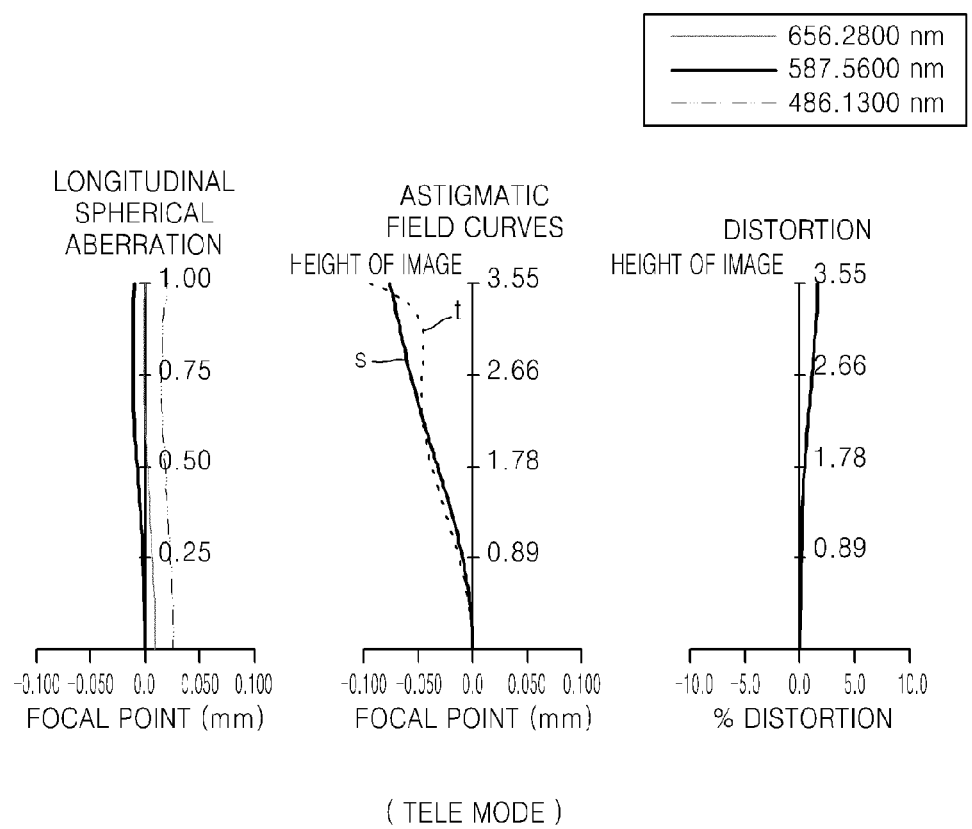
FIG. 9 illustrates longitudinal spherical aberration, astigmatic field curves, and distortion of the lens optical system of FIG. 6 in the tele mode.
Figure 10:
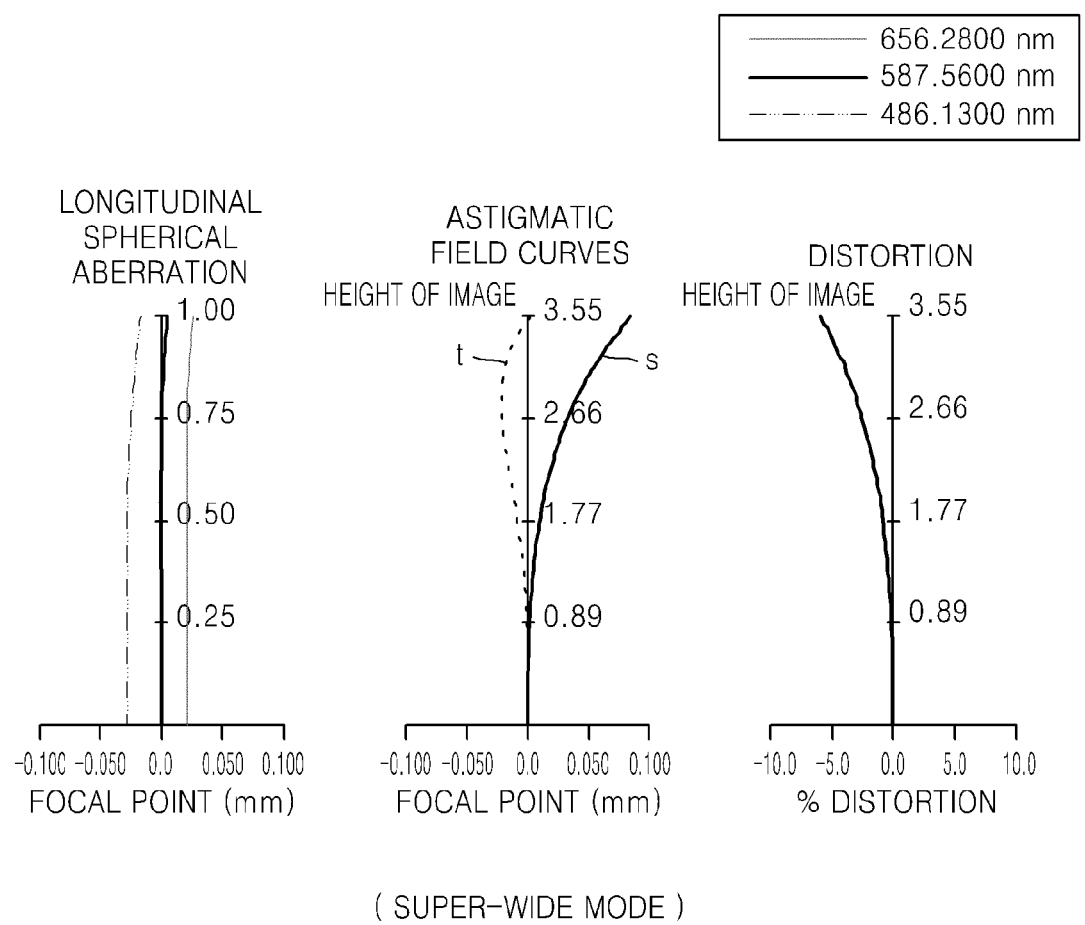
FIG. 10 illustrates longitudinal spherical aberration, astigmatic field curves, and distortion of the lens optical system of FIG. 6 in the super-wide mode.

FIG. 6 schematically illustrates a lens optical system according to another embodiment, operating respectively in a wide mode, a normal mode, a tele mode, and a super-wide mode. A first lens group G11-1 and a third lens group G11-3 of a first optical system according to the present embodiment are substantially similar to the first lens group G1-1 and the third lens group G1-3 of the first optical system of FIG. 1.

A second lens group G11-2 of the first optical system according to the present embodiment includes one unit of a double-concave lens 121 unlike the second lens group G1-2 of the first optical system of FIG. 1. A fourth lens group G11-4 of the first optical system according to the present embodiment includes a positive meniscus lens 141 unlike the fourth lens group G1-4 of the first optical system of FIG. 1. The descriptions about Inequalities 1, 2, and 3 in the lens optical system of FIG. 1 may be identically applied to the lens optical system of FIG. 6.

Table 5 shows design data of the first optical system of the embodiment of FIG. 6.

TABLE 5

| Lens Surface | R | D | Nd | Vd |
|---|---|---|---|---|
| OBJ | INFINITY | — | — | — |
| S1 | 35.734 | 0.6 | 1.7269 | 35.1 |
| S2 | 11.405 | 1.715 | — | — |
| S3 | INFINITY | 3.953 | 1.8340 | 37.4 |
| S4 | INFINITY | 0 | — | — |
| S5 | INFINITY | 3.953 | 1.8340 | 37.4 |
| S6 | INFINITY | 0.5 | — | — |
| S7 | 10.328 | 1.055 | 1.9230 | 20.9 |
| S8* | 15.136 | D1 | — | — |
| S9 | −25.832 | 0.5 | 1.4970 | 81.6 |

TABLE 5-continued

| Lens Surface | R | D | Nd | Vd |
|---|---|---|---|---|
| S10 | 13.646 | D2 | — | — |
| ST: | INFINITY | 0.3 | — | — |
| S12* | 5.167 | 1.282 | 1.5560 | 69.2 |
| S13* | −24.392 | 0.101 | — | — |
| S14 | 6.605 | 1.296 | 1.8780 | 41.1 |
| S15 | −9.318 | 0.4 | 1.7843 | 31.6 |
| S16 | 3.508 | D3 | — | — |
| S17 | −45.364 | 1.159 | 1.7348 | 51.4 |
| S18* | −9.563 | D4 | — | — |
| S19 | INFINITY | 0.5 | 1.5168 | 64.2 |
| S20 | INFINITY | 0.4 | — | — |
| IMG | INFINITY | — | — | — |

In Table 5, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

A lens 162 that is the second lens from the object side in the second optical system according to the present embodiment is a positive meniscus lens unlike the second optical system of FIG. 1.

As described in the embodiment of FIG. 1, in the present embodiment, the first optical mode using the first optical system may be used to photograph another object by using the first optical system in a digital camera or a camera phone. In contrast, in the second optical mode using the second optical system, a user may photograph a self image or make a video call.

Table 6 shows design data of the second optical system of the embodiment of FIG. 6.

TABLE 6

| Lens Surface | R | D | Nd | Vd |
|---|---|---|---|---|
| OBJ | INFINITY | — | — | — |
| S1* | −25.668 | 0.6 | 1.4970 | 81.6 |
| S2* | 4.443 | 1.503 | — | — |
| S3 | 14.597 | 1.197 | 1.9229 | 20.9 |
| S4 | 25.269 | 10 | — | — |
| ST: | INFINITY | 0.3 | — | — |
| S6* | 5.167 | 1.282 | 1.5560 | 69.2 |
| S7* | −24.392 | 0.101 | — | — |
| S8 | 6.605 | 1.296 | 1.8780 | 41.1 |
| S9 | −9.318 | 0.4 | 1.7843 | 31.6 |
| S10 | 3.508 | D3 | — | — |
| S11 | −45.364 | 1.159 | 1.7348 | 51.4 |
| S12* | −9.563 | D4 | — | — |
| S13 | INFINITY | 0.5 | 1.5168 | 64.2 |
| S14 | INFINITY | 0.407 | — | — |
| IMG | INFINITY | — | — | — |

In Table 6, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

Table 7 shows aspherical surface coefficients in the lens optical system according to the embodiment of FIG. 6.

TABLE 7

| Lens Surface | | K | A | B | C | D |
|---|---|---|---|---|---|---|
| First Optical Surface | S8 | −1 | −2.06E−06 | −1.74E−07 | 1.35E−08 | 0.00E+00 |
| | S12 | −1 | 2.52E−05 | 6.67E−07 | 0.00E+00 | 0.00E+00 |
| | S13 | 0 | 4.04E−04 | 0.00E+00 | 0.00E+00 | 0.00E+00 |
| | S18 | 3.03585 | 1.25E−03 | −4.54E−07 | 6.94E−07 | 6.65E−09 |
| Second Optical Surface | S1 | −1 | 0.00E+00 | 0.00E+00 | 0.00E+00 | 0.00E+00 |
| | S2 | −1 | 0.00E+00 | 0.00E+00 | 0.00E+00 | 0.00E+00 |

Table 8 shows data of variable distances during zooming in the lens optical system according to the embodiment of FIG. 6.

TABLE 8

| | Wide Mode | Normal Mode | Tele Mode | Super-wide Mode |
|---|---|---|---|---|
| EFL | 6.3002 | 9.9603 | 17.6403 | 5.298 |
| 2ω | 61.3 | 38.22 | 22.4 | 70.98 |
| Fno | 3.225 | 4.1688 | 6.1442 | 3.157 |
| D1 | 3.318 | 1.3 | — | 2 |
| D2 | 4.5 | 1 | — | 9.357 |
| D3 | 10.073 | 17.486 | 3.715 | 5.687 |
| D4 | 2.895 | 1 | 5.646 | 3.755 |

In Table 8, "EFL" denotes the effective focal length of the overall lens system, "Fno" denotes the F number, "2ω" denotes the full viewing angle, "D1" denotes the distance between the first lens group G11-1 and the second lens group G11-2, "D2" denotes the distance between the second lens group G11-2 and the third lens group G11-3, "D3" denotes the distance between the third lens group G11-3 and the fourth lens group G11-4, and "D4" denotes the distance between the fourth lens group G11-4 and an infrared ray filter 151.

In the lens optical system of FIG. 6, "v32" of Inequality 1, that is, the Abbe's number of the second double-convex lens 132 of the doublet lens of the third lens group G11-3 is 41, which satisfies the conditions of Inequality 1. "nd32−nd33" of Inequality 2, that is, the difference in the refractive index, is 0.09, which satisfies the conditions of Inequality 2. Also, "|f3/fw|" of Inequality 3, that is, the focal length ratio, is 1.5, which satisfies the conditions of Inequality 3.

FIGS. 7-10 illustrate longitudinal spherical aberration, astigmatic field curves, and distortion of the lens optical system of FIG. 6 in the wide mode, the normal mode, the tele mode, and the super-wide mode, respectively. Although the lens optical system is described to include both of the first and second optical systems in the above, the invention is not limited thereto. That is, a lens optical system having the first optical system only that is a zoom lens optical system is available.

Figure 11:
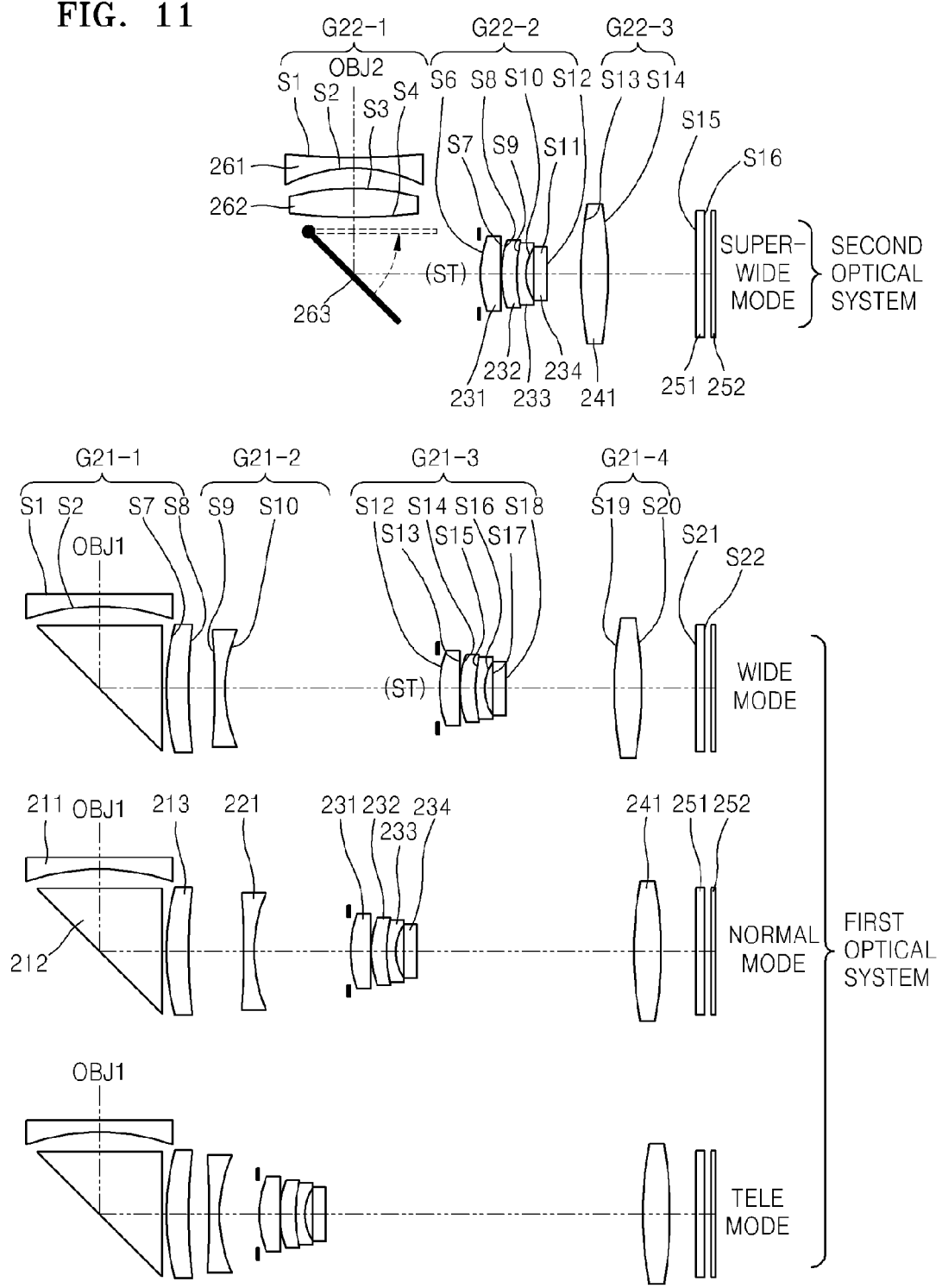
FIG. 11 schematically illustrates a lens optical system according to yet another embodiment, operating respectively in a wide mode, a normal mode, a tele mode, and a super-wide mode.
Figure 12:
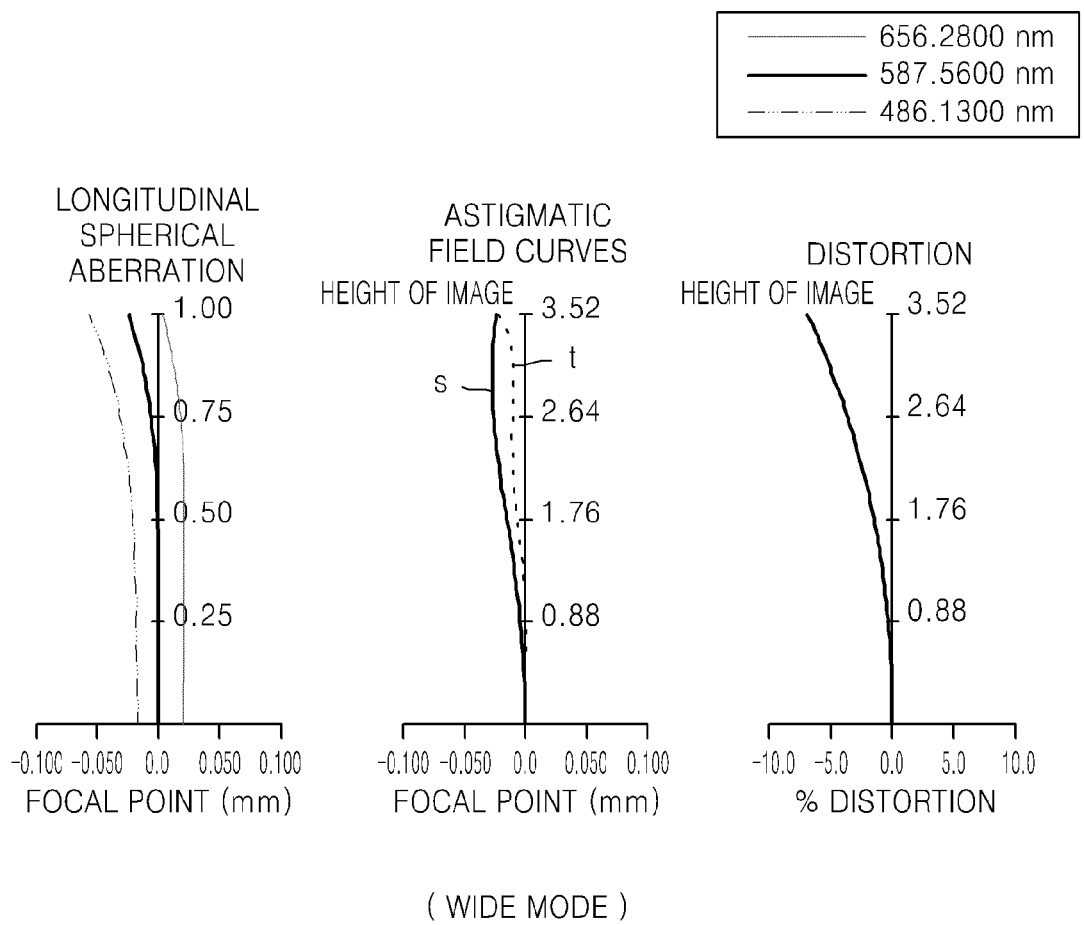
FIG. 12 illustrates longitudinal spherical aberration, astigmatic field curves, and distortion of the lens optical system of FIG. 11 in the wide mode.
Figure 13:
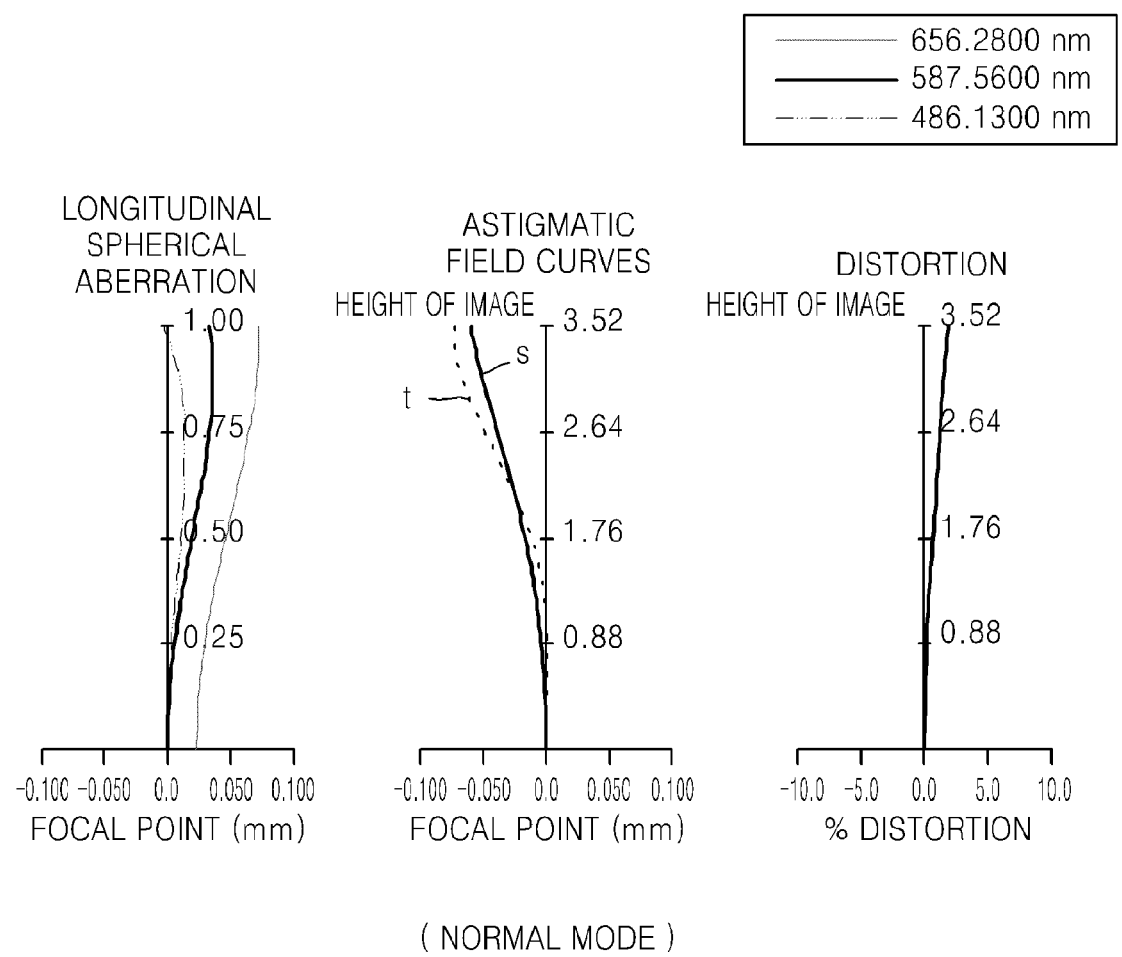
FIG. 13 illustrates longitudinal spherical aberration, astigmatic field curves, and distortion of the lens optical system of FIG. 11 in the normal mode.
Figure 14:
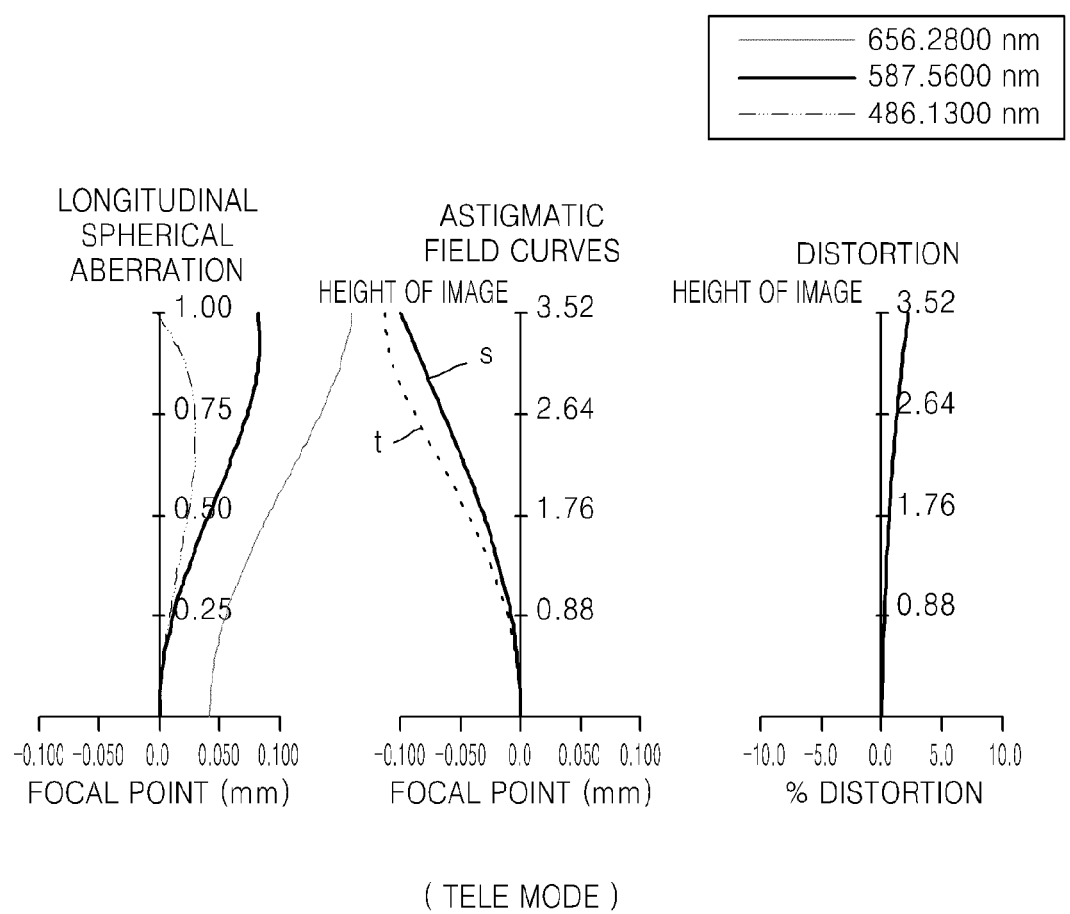
FIG. 14 illustrates longitudinal spherical aberration, astigmatic field curves, and distortion of the lens optical system of FIG. 11 in the tele mode.
Figure 15:
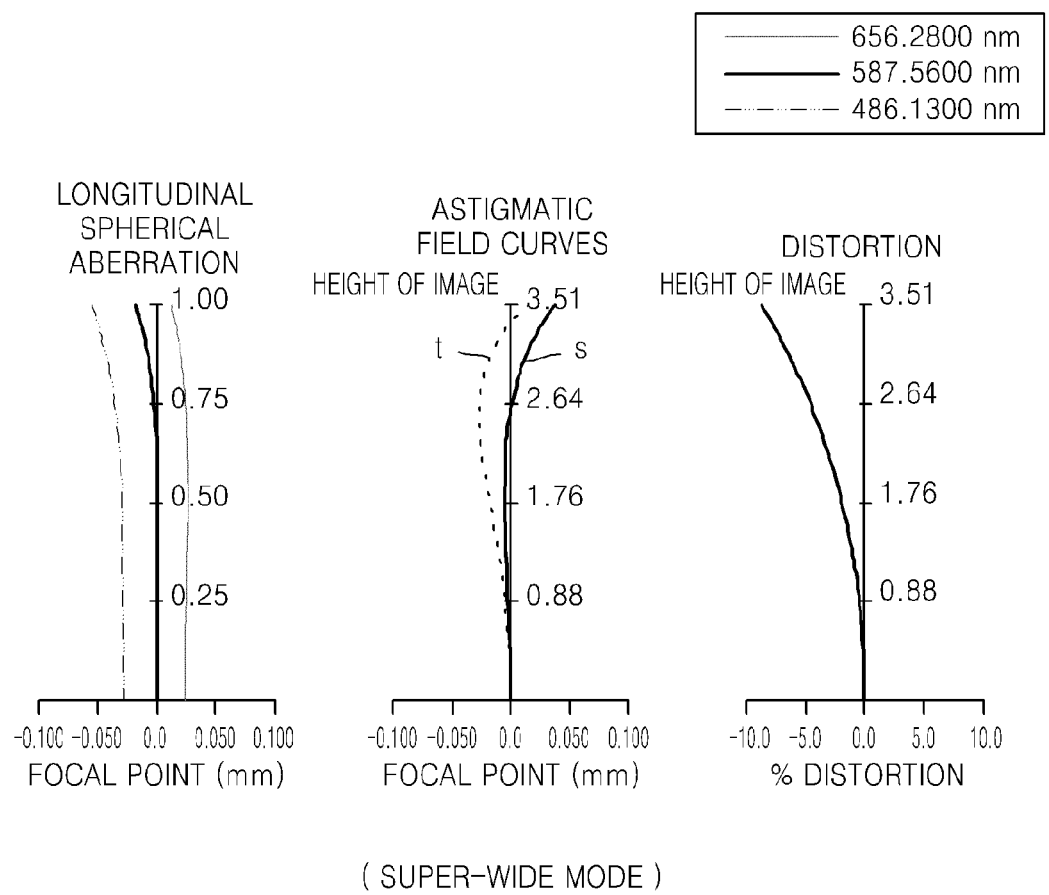
FIG. 15 illustrates longitudinal spherical aberration, astigmatic field curves, and distortion of the lens optical system of FIG. 11 in the super-wide mode.

FIG. 11 schematically illustrates a lens optical system according to yet another embodiment, operating respectively in a wide mode, a normal mode, a tele mode, and a super-wide mode. A first lens group G21-1 of a first optical system according to the present embodiment is substantially similar to the first lens groups G1-1 and G11-1 of the first optical system of FIGS. 1 and 6.

A second lens group G21-2 of the first optical system according to the present embodiment includes one unit of a lens 221. The lens 221 may be a negative meniscus lens. A third lens group G21-3 of the first optical system according to the present embodiment includes four units of lenses unlike the above-described embodiments. The third lens group G21-3 may include a double-convex lens 231, a positive meniscus lens 232, a negative meniscus lens 233, and a negative meniscus lens 234 opposing to the negative meniscus lens 233, which are sequentially arranged along the optical axis from the object side toward the image side.

A fourth lens group G21-4 of the first optical system according to the present embodiment may include one unit of a double-convex lens 241. In the first lens group G22-1 of the second optical system according to the present embodiment, a second incident lens 261 that is a negative meniscus lens, a double-convex lens 262, and a second reflection member 263 are sequentially arranged along the optical axis from the object side toward the image side.

Table 9 shows design data of the first optical system of the embodiment of FIG. 11.

TABLE 9

| Lens Surface | R | D | Nd | Vd |
|---|---|---|---|---|
| OBJ | INFINITY | | | |
| S1 | 500 | 0.6 | 1.9037 | 31.3 |
| S2 | 17.643 | 0.974 | — | — |
| S3 | INFINITY | 3.972 | 1.8340 | 37.4 |
| S4 | INFINITY | 0 | — | — |
| S5 | INFINITY | 3.972 | 1.8340 | 37.4 |
| S6 | INFINITY | 0.2 | — | — |
| S7* | 10.288 | 1.129 | 2.0017 | 19.3 |
| S8 | 16.533 | D1 | — | — |
| S9 | 51.077 | 0.5 | 1.4970 | 81.6 |
| S10 | 9.858 | D2 | — | — |
| ST: | INFINITY | 0.2 | — | — |
| S12* | 5.571 | 1.177 | 1.8513 | 40.1 |
| S13* | −92.857 | 0.1 | — | — |
| S14 | 6.54 | 0.933 | 1.8830 | 40.8 |
| S15 | 24.729 | 0.45 | 1.9229 | 20.9 |
| S16 | 3.458 | 0.548 | — | — |
| S17 | −18.787 | 0.638 | 1.4970 | 81.6 |
| S18 | −300 | D3 | — | — |
| S19* | 20.882 | 1.466 | 1.8061 | 40.7 |
| S20* | −16.855 | D4 | — | — |
| S21 | INFINITY | 0.5 | 1.5168 | 64.2 |
| S22 | INFINITY | 0.4 | — | — |
| IMG | INFINITY | | — | — |

In Table 9, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

A second optical system according to the present embodiment has a large difference from the above-described embodiments in that the second direction in which the second incident lens faces is the same direction as the first direction. That is, the second optical system that is a single focus superwide angle optical system is used to photograph an object placed in the same direction as the first optical system.

In the present embodiment, the switching between the first optical mode and the second optical mode is performed by the rotation of the second reflection member 263. For example, in the second optical mode, the second reflection member 263 pivots by 45° so that the object light OBJ2 faces a photographing device 252. In contrast, in the first optical mode, the second reflection member 263 pivots to be close to the double-convex lens 262 so that the object light OBJ1 is refracted by the first reflection member 212 to proceed toward the photographing device 252.

In the present embodiment, the focal length of the second optical system is shorter than the focal length of the wide mode of the first optical system. Thus, the optical zoom ratio in the embodiment in which both of the first and second optical systems are simultaneously employed may be larger than the embodiment in which only the first optical system that is a zoom lens optical system is employed. In particular, because of the above-described design of the first optical system and the sharing at least one optical element by the first optical system with the second optical system, a high optical zoom ratio may be obtained without increasing the volume of the overall optical system.

Table 10 shows design data of the second optical system of the embodiment of FIG. 11.

TABLE 10

| Lens Surface | R | D | Nd | Vd |
|---|---|---|---|---|
| OBJ | INFINITY | | | |
| S1* | −70.107 | 0.6 | 1.8830 | 40.8 |
| S2* | 5.973 | 1.127 | — | — |
| S3 | 15.196 | 1.773 | 1.9229 | 20.9 |
| S4 | −99.89 | 10.8 | — | — |
| ST: | INFINITY | 0.2 | — | — |
| S6* | 5.571 | 1.177 | 1.8513 | 40.1 |
| S7* | −92.857 | 0.1 | — | — |
| S8 | 6.54 | 0.933 | 1.8830 | 40.8 |
| S9 | 24.729 | 0.45 | 1.9229 | 20.9 |
| S10 | 3.458 | 0.548 | — | — |
| S11 | −18.787 | 0.638 | 1.4970 | 81.6 |
| S12 | −300 | D3 | — | — |
| S13* | 20.882 | 1.466 | 1.8061 | 40.7 |
| S14* | −16.855 | D4 | — | — |
| S15 | INFINITY | 0.5 | 1.5168 | 64.2 |
| S16 | INFINITY | 0.401 | | |
| IMG | INFINITY | | | |

In Table 10, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes an aspherical surface.

Table 11 shows aspherical surface coefficients in the lens optical system according to the embodiment of FIG. 11.

TABLE 11

| | Lens Surface | K | A | B | C | D |
|---|---|---|---|---|---|---|
| First Optical System | S7 | 0.0000E+00 | 9.2588E−07 | 1.2235E−08 | −4.1167E−08 | 1.3018E−09 |
| | S12 | −4.4426E−01 | −2.2316E−04 | 0.0000E+00 | 0.0000E+00 | 0.0000E+00 |
| | S13 | 7.0643E+01 | 1.5013E−04 | 0.0000E+00 | 0.0000E+00 | 0.0000E+00 |
| | S19 | −1.0000E+00 | 0.0000E+00 | 0.0000E+00 | 0.0000E+00 | 0.0000E+00 |
| | S20 | −2.0999E+01 | −1.4012E−04 | 3.6903E−06 | 0.0000E+00 | 0.0000E+00 |
| Second Optical System | S1 | −1 | 0.0000E+00 | 0.0000E+00 | 0.0000E+00 | 0.0000E+00 |
| | S2 | −1 | 0.0000E+00 | 0.0000E+00 | 0.0000E+00 | 0.0000E+00 |

Table 12 shows the variable distances during zooming in the lens optical system according to the embodiment of FIG. 11.

TABLE 12

| | Wide Mode | Normal Mode | Tele Mode | Super-wide Mode |
|---|---|---|---|---|
| EFL | 6.8002 | 11.5599 | 19.0381 | 5.4004 |
| 2ω | 58.18 | 33.28 | 20.53 | 70.93 |
| Fno | 2.8486 | 3.9857 | 5.7252 | 2.7339 |
| D1 | 0.962 | 2.1 | 0.714 | — |
| D2 | 10.755 | 4.568 | 0.8 | — |
| D3 | 4.771 | 10.947 | 17.64 | 2 |
| D4 | 3.919 | 2.756 | 1.2 | 5.79 |

In Table 12, "EFL" denotes the effective focal length of the overall lens system, "Fno" denotes the F number, "2ω" denotes the full viewing angle, "D1" denotes the distance between the first lens group G21-1 and the second lens group G21-2, "D2" denotes the distance between the second lens group G21-2 and the third lens group G21-3, "D3" denotes the distance between the third lens group G21-3 and the fourth lens group G21-4, and "D4" denotes the distance between the fourth lens group G21-4 and the infrared ray filter 251.

In the lens optical system of FIG. 11, the "v32" of Inequality 1 that is the Abbe's number of the positive meniscus 232 of the third lens group G21-3 is 40.8, which satisfies the conditions of Inequality 1. The "nd32−nd33" of Inequality 2 that is the difference in the refractive index is −0.04, which satisfies the conditions of Inequality 2. The "|f3/fw|" of Inequality 3 that is the ratio of the focal length is 1.7, which satisfies the conditions of Inequality 3.

FIGS. 12-15 illustrate longitudinal spherical aberration, astigmatic field curves, and distortion of the lens optical system of FIG. 11 in the wide mode, the normal mode, the tele mode, and the super-wide mode, respectively.

In the above-described embodiments, the photographing devices 52, 152, and 252 convert the received light indicating an image of the object to an electric signal for each pixel, and a charge coupled device (CCD), or a complementary metal oxide semiconductor (CMOS) may be employed therefor. The infrared ray filters 51, 151, and 251 may be respectively arranged before the photographing devices 52, 152, and 252.

The above-descried structures of lenses forming the first lens group to the fourth lens group are exemplary. The number or type of lens units may be appropriately changed by those skilled in the art, within the range of the claims of the present invention, considering the optical performance or aberration.

The above-described lens optical systems may be employed as a digital camera module in a digital camera or a mobile communications device, for example, camera phones.

Figure 16:
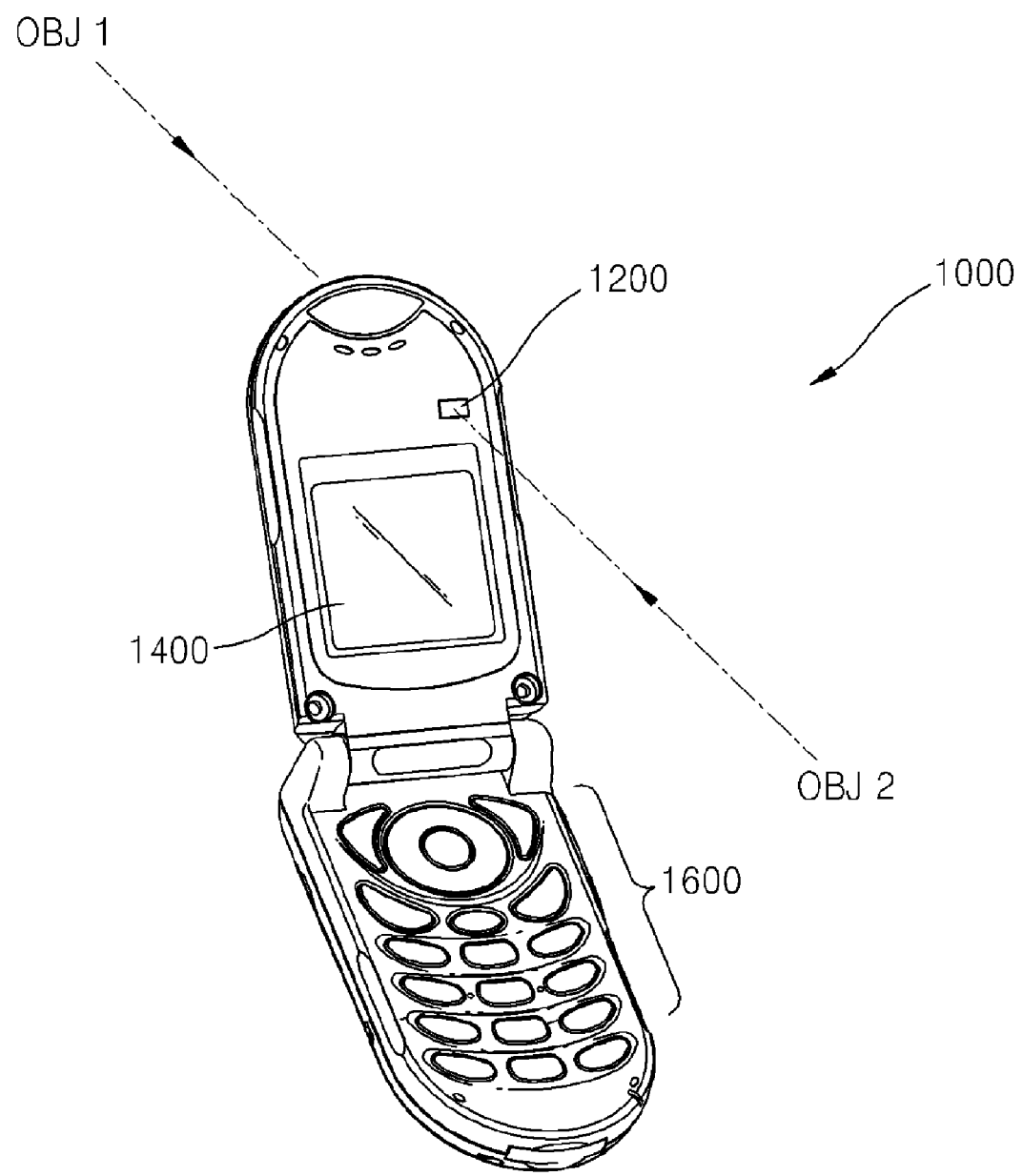
FIG. 16 schematically illustrates the structure of a mobile communications device employing a digital camera module according to an embodiment.

FIG. 16 schematically illustrates the structure of a mobile communications device 1000 employing the digital camera module according to an embodiment. The mobile communications device 1000 according to the present embodiment includes an embodiment of a digital camera module. The digital camera module includes not only the dual lens optical systems of the embodiments described herein, but also an actuating unit (not shown) actuating the reflection members between the first and second optical modes. The mobile communications device 1000 may include a mode selection unit (not shown) that selects any one of the first and second optical modes and an image processing unit (not shown) that converts the electric signal from the photographing device (e.g., 52, 152, 252) to an image signal for displaying the converted signal. The selection of a mode may be performed by an input through, for example, a button unit 1600. An image processed by the image processing unit may be displayed on a screen 1400 for a user's view.

A cover glass 1200 may be installed on an interior surface of the mobile communications device 1000, that is, a surface where the screen 1400 is located. When any one of the dual lens optical systems of the above-described embodiments of FIGS. 1, 6, and 11 is included in the mobile communications device 1000, the light indicating the image of an object is incident on the dual lens optical system through the cover glass 1200. Also, although it is not illustrated, a rear cover glass may be provided on the exterior surface of the mobile communications device 1000, that is, the rear surface of the screen 1400. In the dual lens optical systems of FIGS. 1, 6, and 11, the image of any one of the objects located at the opposite sides with respect to a photographing optical system may be selectively photographed without moving the photographing optical system. Thus, while viewing the screen 1400, the user may selectively photograph the object lights OBJ1 and OBJ2 located at the opposite sides of the screen 1400.

The mobile communications device 1000 of the present embodiment may be applied as, for example, mobile communications devices capable of making a video call and photographing a self image with a single camera module. That is, in a video call mode or a self photographing mode, by selecting the second optical mode, the user may photograph the image of the user while viewing the image of an interlocutor or the image of the user (OBJ2) displayed on the screen 1400. In a general photographing mode, the user may photograph the image of another object (OBJ1) displayed on the screen 1400 while viewing the object.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While a photographing optical system according to the invention and a mobile communications device employing the photographing optical system have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A lens optical system comprising:
a first optical system comprising, in order from an object to an image sensor side along an optical axis:
a first lens group including a first reflection member that selectively redirects an optical path of light representing the object from a first direction toward the image sensor side;
a second lens group having a negative refractive power;
a third lens group having a positive refractive power; and
a fourth lens group having a positive refractive power,
wherein, during zooming from a wide mode to a tele mode, the first lens group is fixed, the second lens group moves toward the image sensor side and then toward the object side, the third lens group moves toward the object side, and the fourth lens group performs focusing.

2. The lens optical system of claim 1, wherein the first lens group comprises in order from the object side along the optical axis:
a negative meniscus lens having a convex surface facing the object side;
a right-angled prism redirecting the optical path by 90° toward the image sensor side; and
at least one lens having positive refractive power.

3. The lens optical system of claim 1, wherein the third lens group comprises:
a first double-convex lens; and
a doublet lens including a second double-convex lens and a double-concave lens.

4. The lens optical system of claim 3, wherein the third lens group comprises at least one unit of an aspherical lens.

5. The lens optical system of claim 3, satisfying Inequalities 1 and 2:

$$40 < v32 < 47 \qquad \text{[Inequality 1]}$$

wherein "v32" denotes the Abbe's number of the second double-convex lens of the doublet lens of the third lens group, and $$-0.1 < nd32 - nd33 < 0.1 \qquad \text{[Inequality 2]}$$

wherein "nd32" denotes a refractive index of the second double-convex lens of the doublet lens of the third lens group with respect to a D-line and "nd33" denotes a refractive index of the double-concave lens of the doublet lens of the third lens group with respect to a D-line.

6. The lens optical system of claim 1, satisfying Inequality 3:

$$1.4 < |f3/fw| < 1.8 \qquad \text{[Inequality 3]}$$

wherein "f3" denotes a focal length of the third lens group and "fw" denotes a focal length in a wide mode.

7. The lens optical system of claim 1, wherein the fourth lens group comprises at least one unit of an aspherical lens.

8. The lens optical system of claim 1, further comprising a second optical system, the second optical system comprising a second reflection member that selectively redirects an optical path of light representing an object from a second direction toward the image sensor side, wherein the second optical system shares at least one optical element with the first optical system.

9. The lens optical system of claim 8, wherein the first optical system is a zoom lens optical system and the second optical system is a single focus optical system having a focal length shorter than a focal length of the zoom lens optical system.

10. The lens optical system of claim 8, wherein the at least one optical element shared by the first and second optical systems comprises the third lens group and the fourth lens group of the first optical system and a photographing device at the image sensor side, and wherein the second optical system comprises a first lens group comprising the second reflection member and having a negative refractive power, the third lens group, the fourth lens group, and the photographing device, in order from the object side to the image sensor side along the optical axis.

11. The lens optical system of claim 10, wherein the first lens group of the second optical system comprises a double-concave lens, a double-convex lens, and the second reflection member in order from the object side to the image sensor side along the optical axis, and comprises at least one unit of an aspherical lens.

12. The lens optical system of claim 8, wherein the first and second directions are opposite to each other on different axes.

13. The lens optical system of claim 8, wherein the first and second directions are identical directions on different axes.

14. A digital camera module comprising:
a photographing device at an image sensor side; and
a lens optical system comprising:
 a first optical system comprising, in order from an object to the image sensor side along an optical axis:
  a first lens group including a first reflection member that selectively redirects an optical path of light representing the object from a first direction toward the image sensor side;
  a second lens group having a negative refractive power;
  a third lens group having a positive refractive power; and
  a fourth lens group having a positive refractive power, wherein, during zooming from a wide mode to a tele mode, the first lens group is fixed, the second lens group moves toward the image sensor side and then toward the object side, the third lens group moves toward the object side, and the fourth lens group performs focusing; and
a second optical system comprising a second reflection member that selectively redirects an optical path of light representing an object from a second direction toward the image sensor side, wherein the second optical system shares at least one optical element with the first optical system, wherein the first optical system performs general photography and the second optical system performs self photography or a video call.

15. The digital camera module of claim 14, wherein the first optical system is a zoom lens optical system and the second optical system is a single focus optical system having a focal length shorter than a focal length of the zoom lens optical system.

16. The digital camera module of claim 14, wherein the at least one optical element shared by the first and second optical systems comprises the third lens group and the fourth lens group of the first optical system and the photographing device at the image sensor side, and wherein the second optical system comprises a first lens group comprising the second reflection member and having a negative refractive power, the third lens group, the fourth lens group, and the photographing device, in order from the object side to the image sensor side along the optical axis.

17. The digital camera module of claim 16, wherein the first lens group of the second optical system comprises a double-concave lens, a double-convex lens, and the second reflection member in order from the object side to the image sensor side along the optical axis, and comprises at least one unit of an aspherical lens.

18. The digital camera module of claim 14, wherein the first and second directions are opposite to each other on different axes.

19. The digital camera module of claim 14, wherein the first and second directions are identical directions on different axes.

* * * * *